United States Patent
Kaertner et al.

(10) Patent No.: US 8,390,921 B2
(45) Date of Patent: Mar. 5, 2013

(54) CAVITY-ENHANCED PARAMETRIC AMPLIFICATION AT FULL REPETITION RATE

(75) Inventors: Franz X. Kaertner, Newton, MA (US); Aleem M. Siddiqui, Framingham, MA (US); Jeffrey Moses, Cambridge, MA (US); Kyung-Han Hong, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 125 days.

(21) Appl. No.: 13/035,952

(22) Filed: Feb. 26, 2011

(65) Prior Publication Data

US 2011/0273763 A1 Nov. 10, 2011

Related U.S. Application Data

(60) Provisional application No. 61/308,669, filed on Feb. 26, 2010.

(51) Int. Cl.
*G02F 1/39* (2006.01)
*G02F 1/00* (2006.01)

(52) U.S. Cl. .............. 359/330; 372/22; 372/105
(58) Field of Classification Search ......... 359/326–332; 372/21–22, 98, 105
See application file for complete search history.

(56) References Cited

U.S. PATENT DOCUMENTS

| 5,117,126 A | 5/1992 | Geiger et al. |
| 6,038,055 A * | 3/2000 | Hansch et al. ............ 359/279 |
| 6,320,886 B1 | 11/2001 | Dawber et al. |
| 7,405,868 B2 | 7/2008 | Kaertner et al. |
| 2005/0238070 A1 * | 10/2005 | Imeshev et al. ............ 372/21 |

OTHER PUBLICATIONS

Korean Intellectual Property Office, International Search Report and Written Opinion for PCT/US2011/026390 (PCT application corresponding to the present US application) (Oct. 27, 2011).
Baumgartner, Richard A., et al., "Optical parametric amplification", IEEE Journal of Quantum Electronics, vol. QE-15, No. 6, pp. 432-444 (1979).
Collier, John, et al., "Evaluation of an Ultrabroadband High-Gain Amplification Technique for Chirped Pulse Amplification Facilities", Applied Optics, vol. 38, Issue 36, pp. 7486-7493 (1999).
Dubietis, A., et al., "Powerful femtosecond pulse generation by chirped and stretched pulse parametric amplification in BBO crystal", Optics Communications, vol. 88, pp. 437-440 (1992).

(Continued)

*Primary Examiner* — Daniel Petkovsek
(74) *Attorney, Agent, or Firm* — Modern Times Legal; Robert J. Sayre

(57) ABSTRACT

Seed light pulses and pump light pulses are generated; the seed light pulses are preferably chirped; and both are directed into an enhancement cavity at a full repetition rate. The enhancement cavity defines a closed optical path that contains a nonlinear medium that provides phase matching at a wavelength different from both the central seed wavelength and the central pump wavelength. The generation of the pump light pulses and the seed light pulses are synchronized to pass the seed light pulses through the nonlinear medium simultaneously with the pump light pulses to parametrically amplify the seed light pulses in the nonlinear medium to produce an amplified signal pulse and idler pulse. Increased conversion with low average pump power can be achieved, as well as gain bandwidth enhancement approaching octave-spanning levels. Additionally, in the case of chirped pump pulses with sufficient bandwidth, optimal output coupling can be designed to achieve the best impedance matching at each temporal coordinate and attain the highest possible conversion and bandwidth.

27 Claims, 6 Drawing Sheets

OTHER PUBLICATIONS

Jovanovic, Igor, et al., "Hybrid Chirped-Pulse Amplification", Optics Letters, vol. 27, Issue 18, pp. 1622-1624 (2002).

Jovanovic, Igor, et al., "Optical Parametric Chirped-Pulse Amplifier as an Alternative to Ti:Sapphire Regenerative Amplifiers", Applied Optics, vol. 41, Issue 15, pp. 2923-2929 (2002).

Llday, F. O., et al., "Cavity-Enhanced Optical Parametric Chirped-Pulse Amplification", Optical Society of America/Conference on Lasers and Electro-Optics (CLEO), pp. 1-2 (2006).

Llday, F. O., et al., "Cavity-Enhanced Optical Parametric Chirped-Pulse Amplification", Optics Letters, vol. 31, Issue 5, pp. 637-639 (2006).

Moses, J., et al., "Exact analytic solutions and conformal profiles for performance scaling of ultrabroadband OPCPA", 1st EOS Topical Meeting on Lasers, Capri, Italy, pp. 1-2 (Sep. 2009).

Siddiqui, Aleem M., et al., "Strong Bandwidth and Efficiency Improvement by Passive Pulse Shaping in Cavity-Enhanced OPCPA", Conference on Lasers and Electro-Optics/International Quantum Electronics Conference, Optical Society of America Technical Digest (CD), pp. 1-2 (May 2009).

Yanovsky, Victor P., et al., "Frequency doubling of 100-fs pulses with 50% efficiency by use of a resonant enhancement cavity," 19 Opt. Lett. 1952-54 (1994).

\* cited by examiner

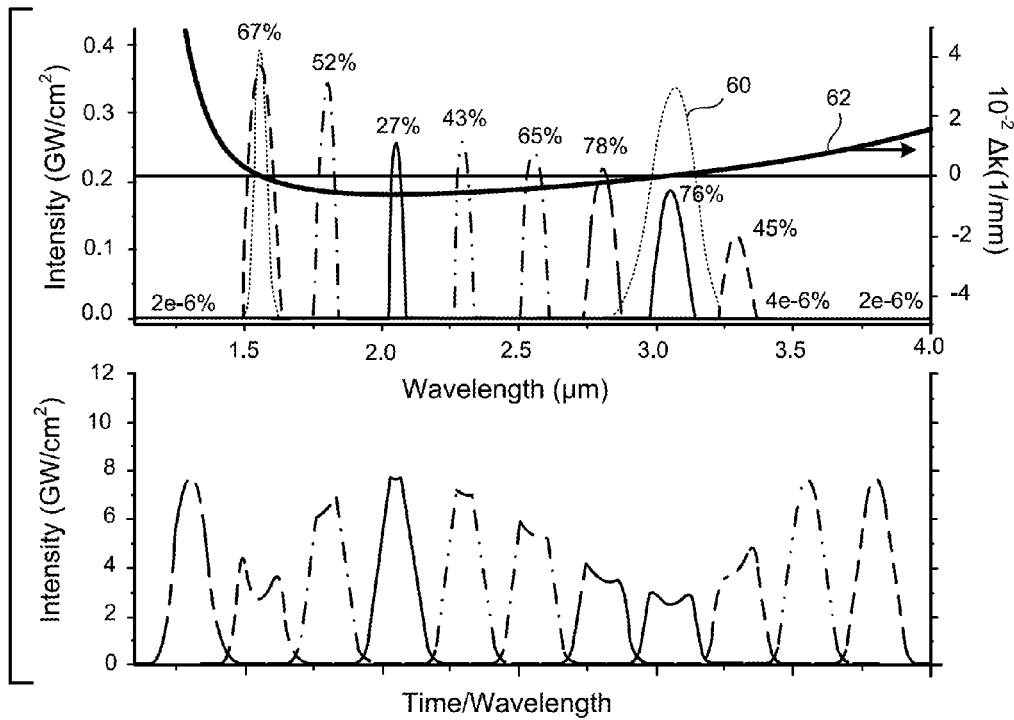
FIG.8
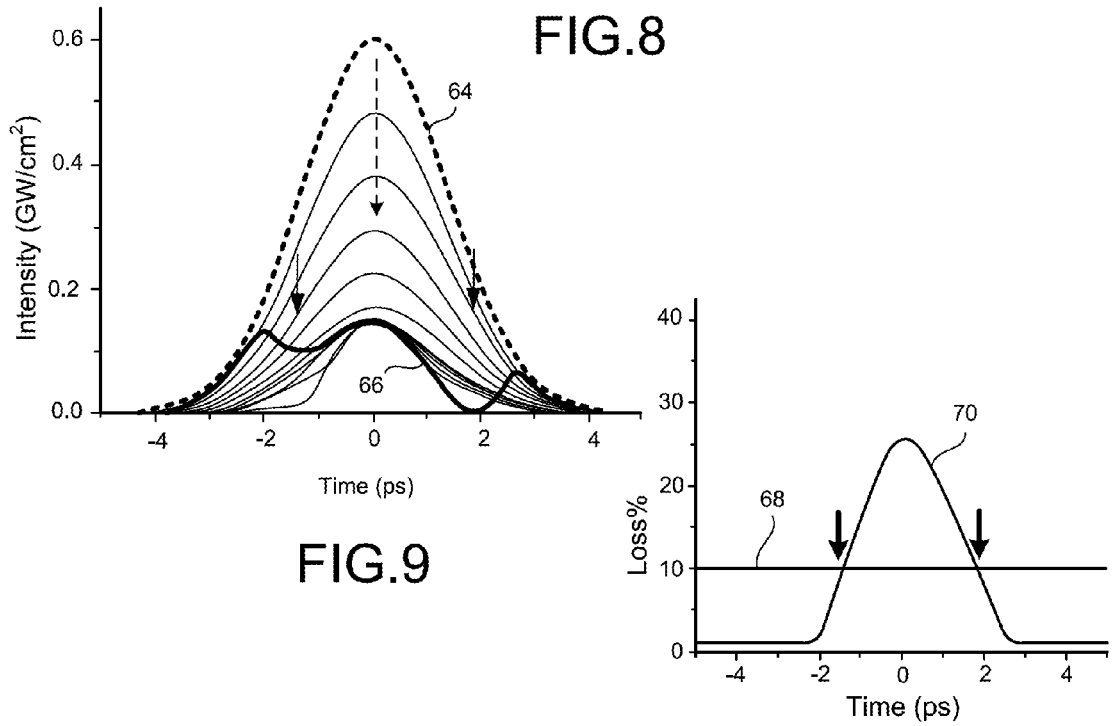
FIG.9
FIG.10

CAVITY-ENHANCED PARAMETRIC AMPLIFICATION AT FULL REPETITION RATE

RELATED APPLICATION

This application claims the benefit of U.S. Provisional Application No. 61/308,669, filed 26 Feb. 2010, the entire content of which is incorporated herein by reference.

GOVERNMENT SUPPORT

The invention was supported, in whole or in part, by grants, FA9550-06-1-0468 and FA9550-07-1-0014 from the Air Force Office of Scientific Research and ECCS-1002286 from the National Science Foundation. The U.S. Government has certain rights in the invention.

BACKGROUND

In ultrafast optics, optical parametric amplification serves to extend the capabilities of ultrashort laser light pulse sources to higher peak powers, higher average powers and new wavelengths. In recent years, efforts to develop optical parametric amplification have produced gain bandwidths supporting direct amplification of few-cycle pulses (i.e., with pulse durations under five cycles) at several wavelengths in the near- and mid-infrared, usually employing beta barium borate ($\beta$-$BaB_2O_4$) or periodically-poled lithium niobate (PPLN), and in one or two instances approaching two-cycle pulse amplification with spectra covering about ⅔ of an octave. However, an octave-spanning spectrum has never been amplified before, due to the unavailability of nonlinear materials and phase-matching techniques with sufficiently broad phase-matching bandwidth.

Meanwhile, the extension of optical parametric amplification to high-repetition-rate systems is a major challenge and a heavily sought-after result. In nonlinear spectroscopy, higher repetition rates would yield faster measurement times and higher signal levels. For frequency metrology, high repetition rates are important for many applications, including astronomy and signal interrogation. Furthermore, high-harmonic generation driven by high-repetition rate, high-average power, few-cycle optical-parametric-amplification sources would present a major step forward for attosecond science by enabling an increase in obtainable photon flux. Optical parametric amplification, however, is traditionally limited to repetition rates low enough that the pulse energy of the pump source can exceed a threshold of approximately 10 µJ, thus allowing enough gain in a feasible geometry. For this reason, parametric amplifiers are normally pumped by amplified lasers with kHz and lower repetition rates. While recent developments in high-average-power amplifiers and oscillators have led to optical-parametric-amplification systems with repetition rates as a high as a few MHz, multi-kW average power pump lasers, with high cost and complexity, are thought to be necessary to push parametric amplifier repetition rates towards 100 MHz and higher with the previous optical-parametric-amplification systems.

The use of optical parametric amplification is suitable for a range of wavelengths and is further described, for example, in R. A. Baumgartner, et al., "Optical Parametric Amplification," IEEE J. Quantum Electron QE-15, 432-444 (1979) and in G. Cerullo, et al., "Ultrafast Optical Parametric Amplification," Rev. of Sci. Instrum 71 1 (2003). Application of the well-known chirped-pulse-amplification technique to parametric amplification was developed in the early 1990's. See A. Dubietis, et al., "Powerful Femtosecond Pulse Generation by Chirped and Stretched Pulse Parametric Amplification in BBO Crystal," Opt. Commun. 88, 433-440 (1992). This so-called parametric chirped-pulse amplification (P-CPA) received attention, for example in J. Collier, et al., "Evaluation of an Ultrabroadband High-Gain Amplification Technique for Chirped Pulse Amplification Facilities," Appl. Opt. 38, 7486-7493 (1999) and in I. Jovanovic, et al., "Optical Parametric Chirped-Pulse Amplifier as an Alternative to Ti:Sapphire Regenerative Amplifiers," Appl. Opt. 41, 2923-2929 (2002).

Cavity-enhanced optical parametric amplification is also discussed in U.S. Pat. No. 7,405,868 B2, in which present inventor, Franz Kaertner, was also named as an inventor.

SUMMARY

Methods and apparatus for cavity-enhanced optical parametric amplification and cavity-enhanced optical parametric chirped-pulse amplification (C-OPCPA) are described herein. Various embodiments of the apparatus and method may include some or all of the elements, features and steps described below.

In a method for cavity-enhanced optical parametric amplification, seed/signal light pulses and pump light pulses are generated and directed into an enhancement cavity whose roundtrip time matches the repetition rate of the two laser sources. The enhancement cavity defines a closed optical path and is resonant with the pump pulses while also being transparent to the amplified signal pulses produced in a nonlinear medium phase matched for optical parametric amplification of the weak seed/signal pulse by the intra-cavity pump energy. Where the seed light pulses are chirped, high conversion efficiency and octave-spanning bandwidth can be obtained; and where the seed light pulses are not chirped, high conversion efficiency can still be obtained over a narrower bandwidth.

Accordingly, pump pulses (chirped or unchirped) can be coherently combined in a low-finesse enhancement cavity transparent to signal and idler. If the seed pulses are sufficiently chirped, each temporal coordinate arrives at a steady state value of intra-cavity pump power and signal amplification/idler generation independently of another. Due to the signal chirp, this corresponds to the cavity amplifying across the signal bandwidth. Since the conversion corresponds to a nonlinear loss, temporal coordinates that experience less initial conversion due to wave-vector mismatch or reduced pump/seed intensity experience greater intra-cavity pump enhancement. The increased pump intensity increases the local conversion thus compensating effects that limit conversion. Thus, the cavity passively shapes the intra-cavity pump profile to attain more optimal conversion and increased bandwidth, overcoming limitations set by the bell-shaped pump intensity profile and the time-varying wave-vector mismatch of the interacting pulses. With these methods, octave-spanning gain bandwidth can be achieved at high conversion efficiency and high repetition rate (e.g., at least 80 MHz) using the C-OPCPA with low average pump power sources, wherein few-cycle sources can be efficiently amplified without the need for pump-power scaling.

The nonlinear medium can be phase matched at the signal wavelength where modest improvements in gain bandwidth can be attained, or more importantly at a wavelength different than both the central seed wavelength and the central pump wavelength. The phase-matched point is chosen such that the maximum deviation from zero of the wave-vector mismatch, $\Delta k$, across the interacting pulses can be compensated by the action of the enhancement cavity over the broadest temporal range, which corresponds to the broadest wavelength range due to the signal chirp. Additionally, in the case of degenerate pumping, where the signal equals the idler wavelength, and the pump wavelength is half, $\Delta k$ as a function of time/wavelength is parabolic with the center at the central signal wavelength. In this case, we propose a phase matching offset from the central signal wavelength such that $\Delta k=0$ at a shorter wavelength and longer wavelength. At the central signal wavelength there is an offset, which the cavity can compensate for by building up pump intensity. In this configuration, the cavity can convert pump intensity beyond the spectral range defined by the two wavelengths where $\Delta k=0$. This effect results in octave-spanning gain bandwidths. The generation of the pump light pulses and the seed light pulses are synchronized to pass the chirped seed light pulses through the nonlinear medium simultaneously with the pump light pulses to parametrically amplify the chirped seed light pulses in the nonlinear medium to produce an amplified signal pulse and idler pulse.

The relation between intra-cavity loss, $L(t)$, and the output coupling value, $T$, determines system performance. When $L$, which includes both a linear contribution and a nonlinear time varying component from the intra-cavity conversion process, equals $T$ at all temporal coordinates, the cavity is perfectly impedance matched; and, therefore, the reflected power vanishes and the enhancement factor (i.e., the ratio between the intra-cavity power and input power) becomes $1/T$. At impedance matching, all incident pump power is dissipated in the loss element, the nonlinear loss is maximized, and conversion is optimal. Reaching a condition closest to impedance matching can enable maximum conversion in C-OPCPA.

Accordingly, if the pump pulses are of sufficient bandwidth and additionally chirped, an additional impedance matching tool can be employed by creating an output coupler that has a wavelength dependence, $T(\lambda)$. In this case, since the signal and pump are chirped in time, and each time corresponds to a wavelength, the output coupler, which is a function of wavelength, can act on each temporal coordinate. Thus, an output coupler can be engineered by specifying $T(\lambda)$ for a given chirped pump and chirped signal. In this way, one can attain the theoretical limit of impedance matching.

The incident pump light pulses can be generated by an ytterbium-doped fiber laser, and the enhancement cavity can be locked to the ytterbium-doped fiber laser via a Hänsch-Couillaud scheme. Meanwhile, seed light pulses (also referred to as "signal" light pulses) can be generated by an erbium-doped fiber laser, and the pump light pulse and seed light pulse repetition rates can be locked via feedback to a piezo-mounted cavity mirror in the erbium-doped fiber laser. The central wavelength of the seed light pulses can be about twice the central wavelength of the pump light pulses (references to "wavelengths" of pulses, infra, should be understood to refer to the central wavelengths of the pulses), and the amplified signal pulses and idler pulses can have the same central wavelength. The nonlinear medium (e.g., a periodically poled lithium niobate crystal) can be selected to provide phase matching at a wavelength that differs from the central seed wavelength by at least 0.1 μm and can bias a wave-vector mismatch versus wavelength such that the maximum deviation of the wave-vector mismatch from zero is maintained in a range from −0.01 and 0.01 mm$^{-1}$ over at least an octave of wavelengths. Also, phase matching can be at the central signal wavelength as well to provide a factor of two improvement beyond the phase matching bandwidth.

In the cavity, only a portion of each incident chirped or unchirped pump light pulse, which can have any duration (though 500 fs is used in the experiments, below), is converted to amplify the seed pulse in the nonlinear medium, and a remaining portion of each chirped pump light pulse is recirculated in the enhancement cavity and coherently added to the remaining portion of other chirped pump light pulses and to each new incoming pump light pulse to form a recirculating intra-cavity pump light pulse that has a conformal profile (i.e., where pump energy is built up where conversion is initially low, compensating for the initial low conversion and maintaining high conversion over the interacting pulses). In the case where phase matching is at the central signal wavelength, a pair of intensity peaks develop toward the outer bands of the intensity spectrum of the seed pulse. In the other case, the octave-spanning gain case, pump energy develops the least at the two phase matched wavelengths and the most at the center where there is a fixed wavevector mismatch (i.e., three humps in the intensity spectrum). In the nonlinear medium, more than 50% of the newly input pump light pulse can be converted to the amplified signal and idler pulses in the nonlinear medium, and the recirculating pump pulse can have an intensity at least 20 times greater than the intensity of new chirped pump light pulse directed into the enhancement cavity.

Embodiments of the apparatus and methods for C-OPCPA, described herein, can provide numerous advantages. The C-OPCPA methods can provide a nonlinear feedback mechanism for passive optimization of pulse shape and compensation of wavevector mismatch through pulse shaping and can enable significant parametric amplification under conditions where an equivalent amount of pump power used in a single-pass configuration would lead to negligible conversion. The C-OPCPA methods can also achieve very high spectral bandwidth, repetition rate and efficiency, which are advantageous in a variety of applications, such as the production of signals for direct frequency-comb amplification, high-flux attosecond pulse generation, attosecond metrology and relativistic optics. The C-OPCPA methods can also produce octave-spanning gain bandwidth and near-quantum-limited conversion efficiency at about 100 MHz repetition rates, using ordinary pump sources and ordinary optical-parametric-amplification media; and any wavelength(s) across the octave-plus span can be extracted and amplified, if desired for a particular application.

BRIEF DESCRIPTION OF THE DRAWINGS

FIG. 8 provides a demonstration of wide tunability in the amplification of 100-nm wide seed pulses at center wavelengths spanning 1 to 4 µm; the amplified signal spectrum is labeled with the fractional conversion to signal and idler, and the phase-matching gain bandwidth and wave-vector mismatch are also shown; at bottom, pump intensities at corresponding temporal coordinates are mapped to the signal wavelength.

FIG. 9 plots the reflection from an initially empty cavity and the progressive reduction in reflected intensity to a final steady-state reflection profile.

FIG. 10 plots the steady-state loss (including nonlinear loss from the parametric conversion and linear losses) and the static input coupling value for the cavity; the intersections (arrows) indicate the impedance matched temporal coordinates; at these coordinates perfect conversion (i.e., zero reflection) is possible, limited only by nonlinear phase effects.

In the accompanying drawings, like reference characters refer to the same or similar parts throughout the different views. The drawings are not necessarily to scale, emphasis instead being placed upon illustrating particular principles, discussed below.

DETAILED DESCRIPTION

Figure 1:
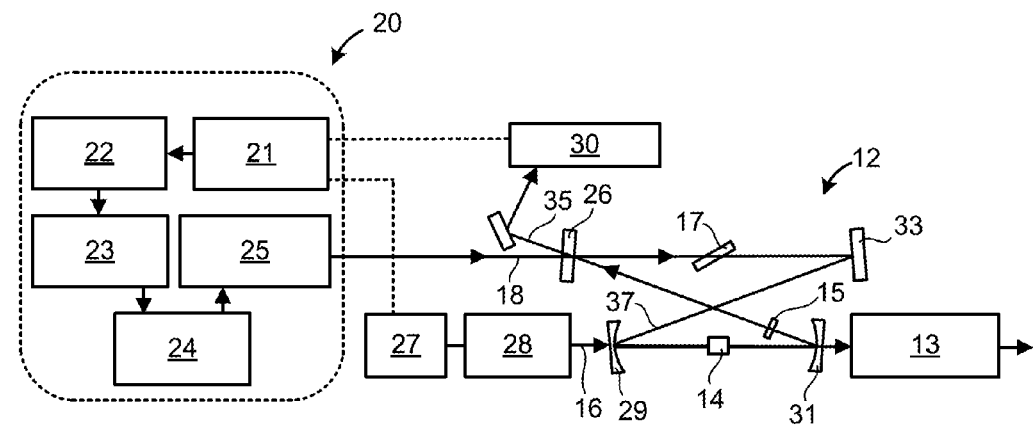
FIG. 1. is a schematic illustration of a C-OPCPA apparatus including an ytterbium-doped fiber laser/amplifier; an erbium-doped fiber laser; a Hänsch-Couillaud locking scheme; an output/input coupler; and periodically poled lithium niobate.

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2% by weight or volume) can be understood as being within the scope of the description; likewise, if a particular shape is referenced, the shape is intended to include imperfect variations from ideal shapes, e.g., due to machining tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "upper," "beneath," "below," "lower," and the like, may be used herein for ease of description to describe the relationship of one element to another element, as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and any spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, the singular forms, "a," "an" and "the," are intended to include the plural forms as well, unless the context clearly indicates otherwise. Additionally, the terms, "includes," "including," "comprises" and "comprising," specify the presence of the stated elements or steps but do not preclude the presence or addition of one or more other elements or steps.

Cavity-enhanced optical parametric chirped-pulse amplification (C-OPCPA), as described herein, can allow octave-spanning gain bandwidth using conventional nonlinear materials, while allowing amplification at 100-MHz and higher repetition rates using conventional pump laser sources. Furthermore, C-OPCPA has the potential to allow near-100% conversion efficiency. This technique employs the use of enhanced pump intensity to compensate for wave-vector mismatch, which, in the C-OPCPA geometry, can lead to efficient amplification at bandwidths far greater than the ordinary phase-matching bandwidth of an optical-parametric-amplification crystal, and even efficient amplification without phase matching.

Optical parametric chirped-pulse amplification (OPCPA), a variation on optical parametric amplification in which the signal pulse is chirped (like conventional chirped pulse amplification), is used typically to allow amplification leading to higher peak powers after recompression and has been used successfully to produce the world's first multi-terawatt few-cycle sources, which operate at 800-nm wavelength and are used to drive attosecond pulse generation, as well as multi-gigawatt few-cycle sources at 2-micron wavelength.

The breadth of OPCPA-based systems is increasing rapidly, acting both as a method to push the extremes of ultrafast science and as a crucial technology in the development of femtosecond multi-Petawatt-class laser systems.

In C-OPCPA (see FIGS. 1 and 2), a modest-Q enhancement cavity 12 at the pump wavelength contains a nonlinear medium 14 phase-matched for parametric amplification of the seed (signal) light pulse train 16 into amplified signal and idler pulses by the pump light pulse train 18. At the nonlinear medium 14, each seed/signal pulse 16 passes through the nonlinear medium 14 at the same time as an intra-cavity pump pulse 37 to undergo parametric amplification; and a portion of each pump pulse is effectively split into (a) a pulse having a wavelength, $\lambda_s$, matching that of the seed/signal pulse 16 and combining with the seed/signal pulse 16 to produce an amplified signal pulse and (b) an idler pulse having a wavelength, $\lambda_i$. The wavelength of the idler, $\lambda_i$, and the wavelength of the signal, $\lambda_s$, are related to the wavelength of the pump light, $\lambda_p$, as follows: $1/\lambda_i + 1/\lambda_s = 1/\lambda_p$. This condition corresponds to energy conservation at the individual photon level. Accordingly, an idler wavelength of about 3070 nm is produced with the pump light 18 and 37 at 1030 nm and with a signal pulse 16 at 1550 nm. In other words, for each new signal photon created by the parametric amplification process, a corresponding idler photon will also be created. This process is continuous in the sense that each pump pulse 37 passing through the nonlinear medium 14 is accompanied by the passage of a paired signal pulse 16 such that the recirculating pump pulse 37 is not allowed to build up due to activity at the nonlinear medium 14 (nonlinear loss) to the fullest extent possible. As such, each roundtrip of the recirculating pump pulse 37 inside the enhancement cavity 12 triggers another parametric amplification of a new signal pulse 16 at the nonlinear medium 14.

A plurality of reflective mirrors and couplers 26, 29, 31 and 33 confine the light path in the enhancement cavity 12. The mirrors and couplers 26, 29, 31 and 33 offer high reflection and low loss to define a closed optical path for circulation of recycled intra-cavity pump light pulses 37 (i.e., the portion of the pump light 37 not converted in the nonlinear medium 14 in the previous cycle) and are chosen to be highly reflective for a narrow band of wavelengths corresponding to the pump light 37, except that input/output coupler 26 can allow, e.g., 10% transmission of the incident pump pulses 18, wherein the reflected pump-light portion 35 is directed to a Hänsch-Couillaud (HC) setup 30 for synchronizing the pump laser 20 to the cavity 12. The cavity can optionally also include a Brewster plate 17 for Hänsch-Couillaud locking of the cavity, though the nonlinear medium 14, itself, has birefringence which may render inclusion of the Brewster plate 17 unnecessary.

The curved mirrors, 29 and 31, that set the two cavity focuses, a tight one at the nonlinear crystal 14 and a looser focus in the other cavity arm, are selected to be substantially transparent to light at the signal and idler wavelengths, allowing the signal and idler pulses 39 to enter and exit the cavity unreflected, while highly reflecting the pump pulses 37. Accordingly, when energy is transferred from the pump light 37 to the signal pulse train 16, a gate or nonlinear loss mechanism effectively remains opened whereby energy can leave the enhancement cavity 12 via the amplified signal and idler pulses 39, akin to optical switching.

Seed/signal and pump pulse trains 16 and 18 are injected into the enhancement cavity 12 through mirror 29 and mirror 31, respectively. The cavity 12, meanwhile, recycles unconverted pump power 37, thus building the pump intensity and boosting the amplifier gain until it is high enough for significant conversion of pump energy to signal and idler to occur. Accordingly, C-OPCPA enables efficient amplification at high repetition rates with low incident pump pulse energies.

The pump laser system 20 for producing the pump pulses 18 can be any generic system producing 10 W, few ps pulses at high repetition rate (e.g., 80 MHz or more). In one embodiment, described here and in the next section, the pulse train 18 includes an ytterbium-doped fiber laser 21 that outputs pulses to a pulse stretcher 22, where the pump pulses 18 are chirped, then to a pre-ytterbium-doped fiber amplifier 23, then to an 8 W ytterbium-doped fiber amplifier 24, and to a pulse compressor 25 before being directed into the cavity 12 through the input/output coupler 26. Meanwhile the seed pulse train 16 is generated by an erbium-doped fiber laser 27 that outputs to a fiber stretcher 28, where the seed pulses 16 are chirped, before directing the seed pulse train 16 into the enhancement cavity 12 through concave mirror 29. The stretcher 28 in combination with the compressor 25 match the length of the seed pulses 16 with the length of the pump pulses 18 so that they are of equal length.

The lasers 21 and 27 are synchronized via electronic locking loops (comprising electrically conductive cables, feedback electronics and a piezoelectronic driver) that couple the lasers 21 and 27. The amplified signal and idler pulse trains 39 exit the cavity 12 through a concave mirror 31 to a compressor 13, optionally with other optical elements to obtain desired characteristics in the amplified signal pulses. The stretchers 22 and 28 and compressors 25 and 13 can be in the form of, e.g., gratings, prism pairs, Gires-Tournois interferometers or optical fibers.

For very-high-Q enhancement cavities, dispersion compensation may be employed to avoid broadening of the recirculated pump light 37 in the enhancement cavity 12 due to the dispersive effects of the nonlinear medium 14. For example, chirped mirrors or Gires-Tournois etalons can be employed in the cavity 12, wherein light at different wavelengths will penetrate different distances into the mirrors and couplers 26, 29, 31 and 33, thereby accumulating chirp that can be made to cancel the dispersion of the nonlinear medium 14.

Figure 3:
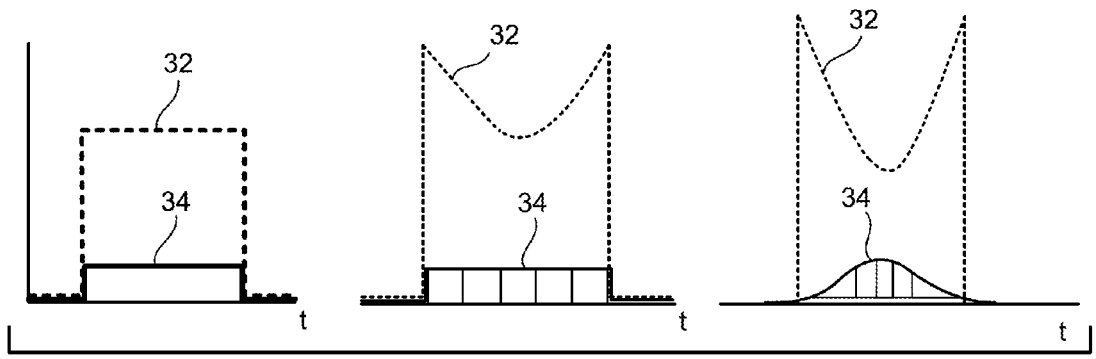
FIG. 3 provides a series of profiles of (at left) a flat-top seed light and pump light pulse combination in optical pulse amplification for comparison and conformal profiles in OPCPA (at center and right) for increasing conversion efficiency while also increasing the range of wavevector mismatches (and thus frequencies) that can be amplified efficiently.

In the cavity-enhanced geometry, the chirp of the signal pulse 16 in the pulse stretcher 22 has the separate, additional function of mapping frequency to time, allowing the cavity 12 to respond to the nonuniformity of the gain spectrum by further enhancing the intensity of the pump light pulses 18 at the temporal coordinates where there is wave-vector mismatch. Thus, the lower gain at frequencies where the wave-vector mismatch is large is offset by higher gain due to higher pump intensity, and the overall conversion of pump light to signal and idler is made uniform in both time and frequency. The resulting "conformal"-type pump profile shape 32 is depicted in the center and right-side images of FIG. 3 in comparison with the seed/signal profile shape 34. Compared to single-pass amplification, this C-OPCPA process allows higher-than-normal conversion efficiency, since the pump depletion is uniform in time, and also allows wider gain bandwidth, since the conversion is also made uniform in frequency, even in the presence of significant wave-vector mismatch.

C-OPCPA, therefore, extends the capabilities of existing optical-parametric-amplification crystals, allowing direct few-cycle pulse amplification at new wavelengths, extending amplifiers already supporting few-cycle pulses to amplifiers that can support single-cycle pulses, and—by combined improvements in conversion efficiency and gain bandwidth—increasing the maximum peak power achievable by the OPCPA technique by an order of magnitude. Furthermore, C-OPCPA allows this at 100-MHz and higher repetition rates.

The C-OPCPA enhancement cavity 12 is at the pump wavelength with a nonlinear loss element, $L_{ni}$, from the intensity-dependent parametric conversion in the nonlinear crystal (i.e., loss due to the frequency-shifting of pump light to signal and idler wavelengths, which are not reflected by the cavity) and a linear loss element, $L_{linear}$, due to, for example, imperfect reflections off cavity mirrors. The total loss, L(t), can be written as follows:

$$L(t) = L_{linear} + L_{ni}(G(t)). \quad (1)$$

The loss is time-dependent through the parametric gain, G(t), $$G(t) \cong \frac{1}{4}\exp(2g(t)L) = \frac{1}{4}\exp\left(2\sqrt{\Gamma(t)^2 - (\Delta k(t)/2)^2}L\right), \quad (2)$$

which depends on both the time-varying pump intensity, $\Gamma(t) \sim \sqrt{I_p(t)}$, and the local wave-vector mismatch, $\Delta k(t)$. Equation (2) describes the amplifier well when only up to a small fraction (<20%) of the pump light pulse is converted to signal and idler, and when the seed pulse is strongly chirped, forming a strong correlation between temporal coordinate and frequency of the signal pulse. This mapping of frequency to time, resulting in a nonlinear interaction between waves that are locally quasi-monochromatic at each temporal coordinate, allows OPCPA to be treated as having a time-varying wave-vector mismatch that remains unchanged during propagation.

The power developed in the cavity and the power reflected from the input/output coupler 26 are described by the following equations:

$$P_{buildup} = \frac{T \times P_0}{\left(1 - \sqrt{R \times (1-L)}\right)^2}, \quad (3)$$

$$P_{reflected} = \left|\sqrt{R} - \frac{\sqrt{(1-L)}\,T}{1 - \sqrt{R(1-L)}}\right|^2 \times P_0,$$

where T and R are the transmission and reflection coefficients of the input/output coupler 26, and L(t) is the cavity loss for each temporal coordinate. Obeying Equation (1), the loss is a function of available pump intensity, seed intensity and wave-vector mismatch. When L=T, the cavity is impedance matched; i.e., the reflected power vanishes, and the intra-cavity power is enhanced by a factor of 1/T. Thus, all of the power incident on the cavity is dissipated through the cavity loss. In C-OPCPA, one can advantageously attempt to arrive at a condition closest to impedance matching for all temporal coordinates such that all of the incident pump power is dissipated in the nonlinear loss element (i.e., converted to signal and idler). The simulations, below, show that an enhancement cavity with a sufficient Q-factor and a proper ratio of incident pump and seed powers naturally arrange for conditions close to this; pump power builds until the loss balances the newly injected pump power with each round trip, while good adherence to the impedance matching condition, L(t)=T, on average, allows nearly all of the pump light incident upon the cavity to enter unreflected.

Exploring C-OPCPA dynamics, various combinations of the experimental parameters were investigated, including input/output coupler transmission, pump and seed power, crystal length, seed bandwidth, and wave-vector mismatch, by means of one-dimensional numerical simulations. C-OPCPA was simulated with pump and seed repetition rates both matched to the inverse of the cavity period, and with narrowband pump and broadband chirped seed pulses of equal duration and Gaussian shape. With each round-trip through the cavity, the intra-cavity pump electric field is modified in amplitude and phase by (1) simulation via the split-step method of propagation through the optical-parametric-amplification crystal, resulting in depletion of the pump intensity and phase shifts due to both optical parametric amplification and self-phase modulation, (2) subtraction of fixed linear losses, and (3) combination of the intra-cavity field with the next pump pulse incident upon the cavity. The simulation was run until a steady-state intra-cavity pump power developed.

Figure 4:
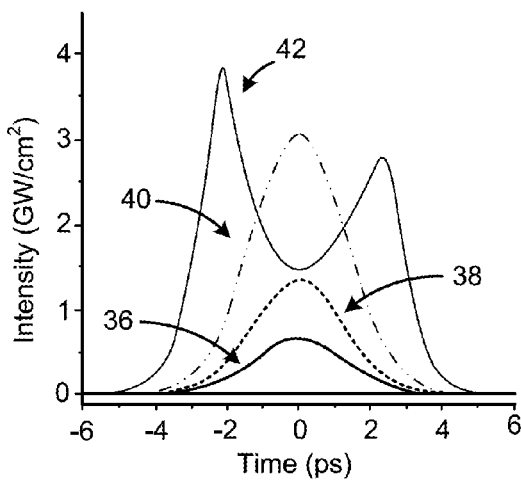
FIG. 4 provides intensity profiles of seed light pulses multiplied by $10^7$ and pump in a single-pass case, as well as incident pump and intra-cavity pump light pulses in a cavity-enhanced case.
Figure 5:
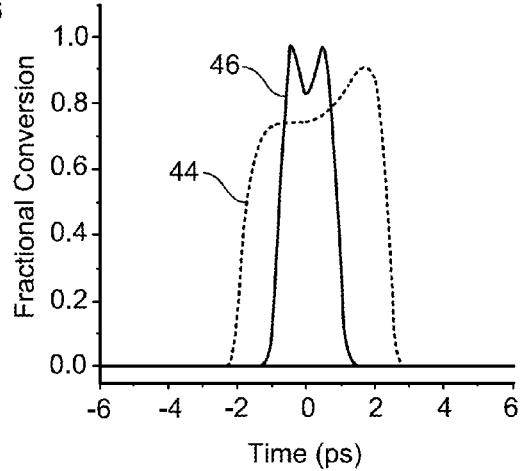
FIG. 5 plots the conversion efficiency (conversion of incident pump to signal plus idler) versus time for a single-pass case compared to a cavity-enhanced case.

FIGS. 4 and 5 show a simulation result for the case of a 3-ps, transform-limited pump pulse train at 1030 nm and 3-ps chirped seed pulse train at 1550 nm with a bandwidth of 100 nm, which mix in a 5 mm PPLN crystal. The repetition rate was 80 MHz. These conditions, with a pump average power of 23 W, allow enough gain for close-to-optimal single-pass OPCPA, in which there is slight back-conversion of signal and idler to pump at t=0, and in which the efficiency-bandwidth product is maximized. This result was compared with the result of placing the optical-parametric-amplification crystal in an enhancement cavity with 1% linear losses, an input/output coupler 26 with transmission, T, equal to 10%, and with a pump average power of only 5 W.

FIG. 4 shows the relevant intensity profiles of the incident pump light 36, the signal 38 (100 nm bandwidth)×10', a single-pass pump light 40, and the intra-cavity pump light 42. Meanwhile, FIG. 5 shows the fractional conversion of incident pump light to signal and idler as a function of time with 44 and without 46 an enhancement cavity. In the single-pass fractional conversion 46, gain narrowing limits the total conversion efficiency to 43% and limits the bandwidth of the amplified signal to 52 nm at full width at half maximum (FWHM). In comparison, the C-OPCPA case 44 produces a signal pulse with 103-nm bandwidth at a total 68% conversion efficiency, thus extending the amplifier bandwidth by a factor of two while simultaneously increasing the conversion efficiency. Moreover, the C-OPCPA device operates with less than one fourth of the input pump energy (i.e., average power) of the single-pass device.

The fractional conversion 44 of incident pump light power to signal and idler, as shown in FIG. 5, is the net conversion efficiency of the C-OPCPA input to its output. The intra-cavity conversion efficiency [(signal+idler)/intra-cavity power], however, is only 9% averaged over time. The total cavity loss, L(t), therefore, on average roughly equals the input/output coupler transmission, T=10%. As shown in FIG. 4, the intra-cavity pump light intensity 42 has grown by a factor of about 18 at the peaks to compensate for a low small-signal gain due to the large wave-vector mismatch at the edges of the spectrum. In contrast, the enhancement is only about two at t=0, where the wave-vector mismatch is zero. This intra-cavity pump light intensity profile 42 allows the conversion efficiency to be roughly uniform in time. Since the signal is chirped, the gain is also roughly uniform in frequency. Note, in this example, the amplified signal bandwidth is 4.3 times broader than the phase-matching bandwidth [24 nm, calculated from Equation (2) in the normal way as the 1/e full width of gain versus signal frequency, using the peak intensity of the incident pump pulse]. This is possible in parametric amplification since the effect of wave-vector mismatch on the gain/conversion can be cancelled by increased nonlinear drive, $\Gamma$, as described by Equation (2) in the limit of low intra-cavity fractional conversion.

The above example shows an increase by a factor of two in gain bandwidth compared to the optimal single-pass gain bandwidth. This capability (extension of gain bandwidth by several times combined with boosted conversion efficiency) can be employed in a wide range of OPCPA systems. A particularly dramatic result, which is the main content of this finding, can be obtained when C-OPCPA is used in conjunction with a group-velocity matched, degenerate optical-parametric-amplification configuration, which has a phase-matching bandwidth that spans a significant fraction of an octave. For example, using cavity parameters similar to those of the example, above, but with signal and idler wavelengths equal at twice the pump light wavelength (wherein the signal and idler wavelengths are 2.06 μm, thereby providing a degenerate optical parametric amplifier), we have calculated that the C-OPCPA technique can be used to extend the gain bandwidth to 1.3 octaves; noting that the cavity offsets the effect of wave-vector mismatch, the optical-parametric-amplification crystal poling period can be chosen to bias the wave-vector mismatch versus wavelength such that the maximum deviation, $\Delta k$, from zero is minimized (e.g., maintained in the range from $-0.01$ and $0.01$ mm$^{-1}$) over the largest possible wavelength range. A nonlinear medium with a poling period for phase-matching at a desired wavelength can be obtained from the range of offerings from, e.g., Covesion Ltd of Romsey, Hampshire, UK, or HC Photonics Corp. of Hsin-chu, Taiwan.

Figure 6:
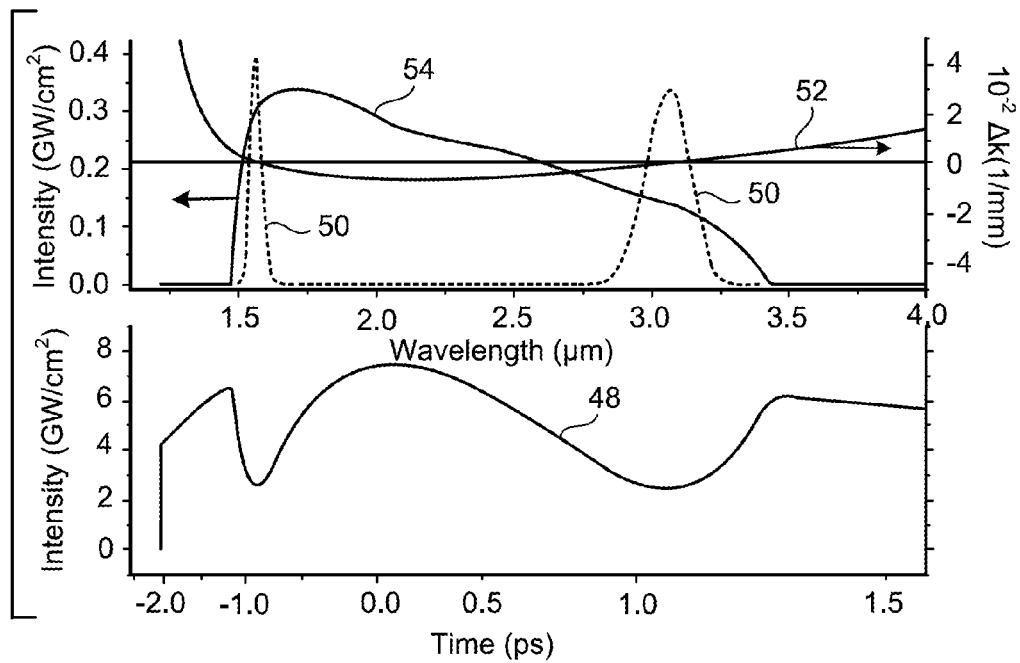
FIG. 6 plots the following for C-OPCPA pumped at 1.03 µm, seeded around the degeneracy point with bandwidth covering 1.4 to 3.5 µm, phase matched at 1.5 µm, and with input/output coupler transmission, T, equal to 10%: wave-vector mismatch, phase-matching bandwidth, amplified signal, and the corresponding intra-cavity pump intensity profile at the bottom.

FIG. 6 illustrates an example where the wave-vector mismatch 52 is biased versus wavelength to provide an extended range (from about 1.4 to about 3.4 μm) over which $-0.01$ mm$^{-1}$<$\Delta k$<$0.01$ mm$^{-1}$. In addition to the wave-vector mismatch 52, FIG. 6 includes plots of the intra-cavity pump light profile 48, phase matching 50, and the amplified signal 54 for an interaction in a C-OPCPA device pumped at 1.03 μm, seeded around the degeneracy point with a bandwidth covering 1.5-3.4 μm ($-10$ dB bandwidth), and phase-matched at 1.55 μm. The input/output coupler 26 has a T equal to 10% in this embodiment, and the total conversion efficiency is still as high as 53% in this example.

Figure 7:
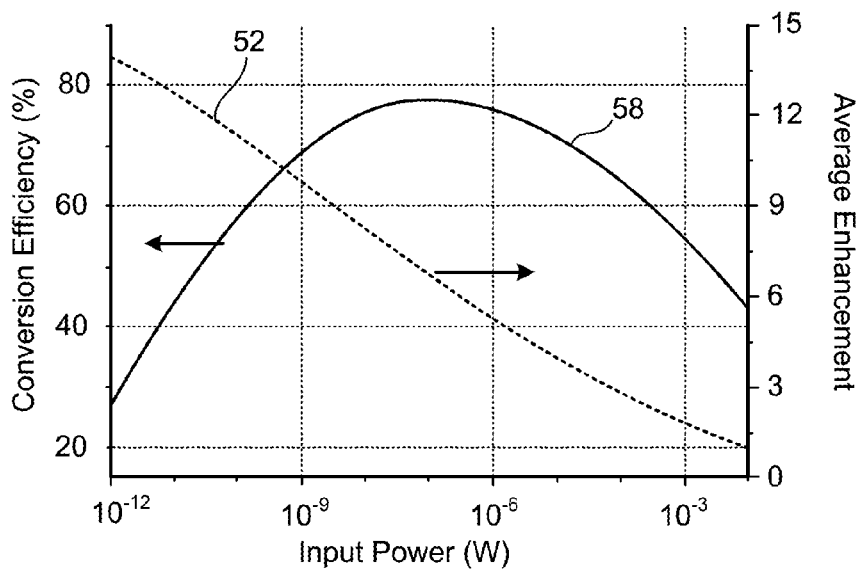
FIG. 7 plots the conversion efficiency for narrow-band (10-nm wide) seed pulses as the input power is tuned; the cavity has a 10% input/output coupler and 1% linear loss; the enhancement (also plotted) self adjusts to maintain high conversion efficiency over a variation in seed power covering several orders of magnitude.

C-OPCPA can also offer low sensitivity to the seed light power once the enhancement cavity 12 is optimized for a given incident pump light power. For example, FIG. 7 shows simulation results for quasi-monochromatic pump and signal pulses with varying incident seed power. Conversion efficiency for narrow-band (10-nm wide) seed pulses as the input power is tuned is shown with plot 56. The enhancement cavity 12 has a 10% input/output coupler 26 and 1% linear loss. The enhancement 58 self adjusts to maintain high conversion efficiency over a variation in seed light power covering several orders of magnitude. Since gain is proportional to exp $(I_p^{0.5})$, a small increase in intra-cavity intensity, requiring a small increase in enhancement, can increase the gain by an order of magnitude, making up for a corresponding order-of-magnitude drop in seed power. FIG. 7 illustrates how the cavity naturally responds to changes in seed power, self-optimizing the amount of enhancement to provide good conversion efficiency for input seed powers ranging five orders of magnitude. The highest conversion efficiency of 77% is achieved with about 1 μW of signal power, which allows the best impedance matching. The ability of the cavity to compensate for reduced seed power is ultimately limited by the maximum cavity finesse.

FIG. 8 summarizes simulations of C-OPCPA with 100-nm seed pulses centered throughout the 1.5-3.3 μm range. At the top, the amplified signal spectrum (represented in the horizontally spaced sequence of solid-line peaks) is labeled with fractional conversions to signal and idler. The phase-matching gain bandwidth 60 is shown in dashes, and the wave-vector mismatch 62 is also plotted, with units on the right-side axis. At the bottom, pump light intensities at corresponding temporal conditions are mapped to the signal wavelength. In each case, the seed pulse is appropriately stretched to match the pulse duration of the pump light, and the PPLN optical-parametric-amplifier crystal is phase matched at 1.55 μm. These results highlight the enhancement cavity's ability to efficiently amplify the seed pulse when the parametric conversion process is phase mismatched; while the phase-matching bandwidth 60 covers only narrow regions around 1.55 μm and 3.07 μm, efficient conversion of incident pump light to signal plus idler (ranging from 27 to 78%), occurs over the full 1.5-3.3 μm range. These results are possible due to the ability of an increased nonlinear drive to exactly compensate for reductions in gain due to wave-vector mismatch [see Equation (2)] when the intra-cavity conversion is low. Since low intra-cavity conversion is the natural operating point of the cavity, amplification without phase matching is possible. These results highlight the additional practical C-OPCPA capability of wide tunability covering a greater-than-octave bandwidth, using a single nonlinear crystal and without needing realignment. For example, if the white light continuum is stretched to a much longer duration than the pump pulse, the device can be tuned to efficiently amplify a different wavelength by simply adjusting the delay between pump and seed pulses by means of a delay stage.

In C-OPCPA, the steady-state loss due to conversion of pump to signal and idler is, in general, different at each point in time due to the time-varying wave-vector mismatch, incident pump intensity, and seed intensity. However, the goal in C-OPCPA is to optimize impedance matching by setting cavity loss equal to the input/output coupler transmission at all points in time. For a generic input/output coupler, with a roughly flat transmission spectrum over the narrow bandwidth of the pump, this is not possible.

FIGS. 9 and 10 provide an example of the temporally varying impedance matching that can occur in C-OPCPA. FIG. 9 shows the reflected power at the input/output coupler 26 versus time for a simulation corresponding to our experimental parameters, showing the reflection intensity from an initially empty cavity 64, with progression of the reduction in reflected intensity shown with lighter curves, leading to the final steady-state reflection profile 66. The local minima in reflection occur where the T=L condition (input/output coupler transmission equals loss) is fulfilled (the nonzero reflection at t=−1.5 ps is a consequence of self-phase modulation and asymmetric wave-vector mismatch). As FIG. 10 illustrates, while the input/output coupler transmission 68 is constant, the steady-state loss 70 has a peaked shape, and impedance matching can only occur at two temporal coordinates, designated with arrows in FIGS. 9 and 10.

Via the design of the dielectric mirror, an input/output coupler 26 can be constructed that will allow impedance-matched C-OPCPA at all points in time. By chirping the pump pulse with sufficient bandwidth, creating an additional map of frequency to time on the pump wave, a specifically designed input/output coupler transmission spectrum to set T(t) equal to L(t) can be used for all temporal coordinates. The input/output coupler 26 can be designed as a function of wavelength T(λ) by specifying the thicknesses of the dielectric layers comprising the mirror. Due to the time-wavelength matching the design is chosen such that each point in time is optimal, i.e. T(λ(t))=L(t, thus, by tailoring the input/output coupler 26, one may obtain near-100% conversion efficiency, further extending the performance of the C-OPCPA technique.

EXPERIMENTAL

In this section, an experimental demonstration of C-OPCPA is presented, showing more than 50% conversion efficiency of coupled pump light at a high repetition rate (78 MHz). Through comparison with the single-pass case, underlying impedance matching conditions are evaluated and related to the C-OPCPA performance.

Figure 2:
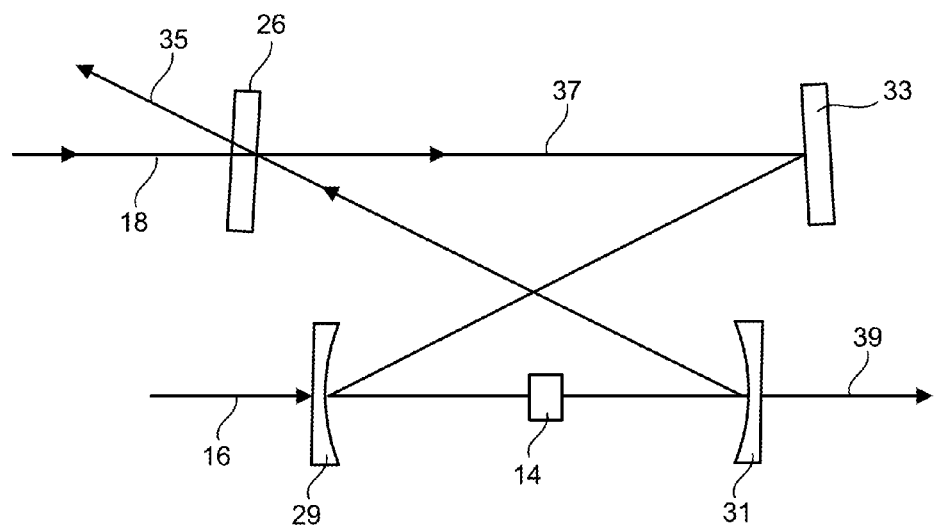
FIG. 2. provides a conceptual diagram of the cavity in a C-OPCPA apparatus.

The optical layout was as schematically illustrated in FIG. 1. An Yb-doped fiber laser 21 centered at 1.03 μm seeded the OPCPA pump chain 18, and an Er-doped fiber laser 27 centered at 1.56 μm produced the C-OPCPA signal 16. Both laser sources had a 78-MHz repetition rate. The pump pulses 18 from the Yb-doped fiber laser were amplified in a conventional femtosecond chirped-pulse amplification system, including a grating stretcher 22, a Yb-doped fiber pre-amplifier 23 for a preliminary energy boost, an 8-W Yb-doped fiber amplifier 24 for a greater energy boost, and a dielectric grating compressor 25. This pump system 20 provided 5-nm in full-width at half maximum (FWHM) bandwidth pump pulses with durations down to 500 fs with up to 6-W average power.

The Er-doped fiber laser signal pulses 16 were stretched to about 3 ps using 5 m of single-mode fiber as the stretcher 28. The large seed pulse chirp and the chosen delay between pump and signal pulses optimized conversion efficiency for a well-phase-matched 4-nm segment of the seed spectrum centered at 1565 nm. This resulted in only about 20 μW of seed power overlapping the gain window set by the pump. The pump pulses 18 and stretched seed pulses 16 were simultaneously injected into a 78-MHz cavity 12 with a 10% input/output coupler 26, resonant with the intra-cavity pump pulses 57 and containing a 20-mm-long periodically poled lithium niobate (PPLN) crystal that is anti-reflection coated at the pump, signal and idler wavelengths (as the nonlinear medium 14). PPLN was chosen for use as the nonlinear medium 14 because its large $d_{eff}$ value enables the use of low pulse energy at high repetition rate. Two telescopes were used to focus the pump and seed beams 18 and 16 into the PPLN and to match the closed cavity mode diameter of 100 μm.

The cavity 12 was locked to the Yb-doped fiber laser via the Hänsch-Couillaud (HC) scheme 30. The pump and signal source repetition rates were electronically locked by feedback to a piezo-mounted cavity mirror in the Er-doped fiber laser 27. Slow and fast feedback loops were employed at 78 MHz and 9 GHz, respectively, for high-precision locking. Less than 50 fs of timing jitter was measured between the two lasers, which is sufficient considering the pump pulse duration of 500 fs and the signal pulse duration of 3 ps.

Figure 11:
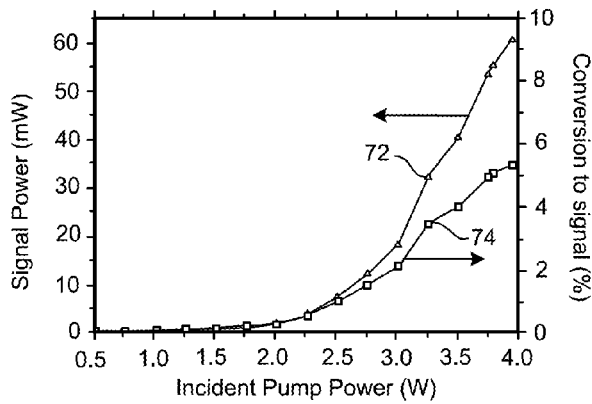
FIG. 11 plots the conversion to signal and amplified signal intensity for a single-pass case.
Figure 12:
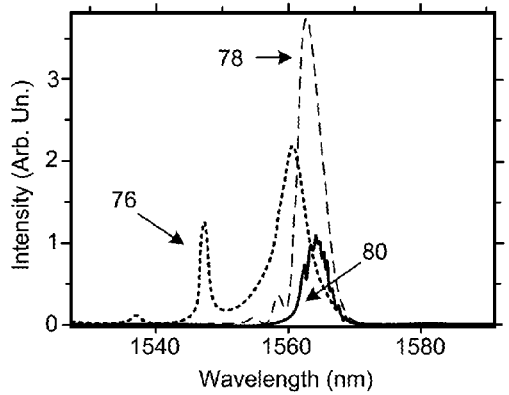
FIG. 12 plots the signal input spectrum, the signal amplified via single pass, and the signal amplified via C-OPCPA.

Single-pass parametric amplification was first performed using the same C-OPCPA setup of FIG. 1 without closing the enhancement cavity 12; i.e., mirror 31 was removed. FIG. 11 shows the amplified signal power 72 and the conversion to signal 74 as a function of pump light power for the single-pass case; and FIG. 12 shows the scaled seed input spectrum 76 and the amplified signal spectrum 78 when 4 W of pump power were used, in comparison with a signal amplified via single pass 80. With 4 W of 500 fs pump pulses and about 20 μW of seed power, we were able to convert 5% of the pump light power into signal at 78 MHz. Accounting for the idler at 3.03 μm, which was fully absorbed in a BK7 collimating lens, the total pump light depletion was estimated to be about 8%. Thus, with the same 4 W of intra-cavity power, the nonlinear loss in the closed cavity is expected to be about 8%, as well. Allowing for about 2% linear losses from components in the enhancement cavity 12 (i.e., mirrors and AR coatings on the PPLN), then the total intra-cavity loss can thus be tuned to about 10%. Thus, a 10% input/output coupler 26 is suitable for impedance matching. Additionally, the single-pass experiment shows that sufficient amplification can be achieved before crystal damage occurs at the desired power levels.

The performance of the C-OPCPA with 10% output coupling for impedance matching was evaluated by monitoring the intra-cavity power, the reflected power and the signal power under various seeded and unseeded scenarios. The first parameter evaluated was the coupling efficiency. Higher-order modes are completely rejected by the cavity when locked on the fundamental mode. This uncoupled light does not contribute to conversion. The total conversion efficiency to signal and idler is therefore scaled by the coupling efficiency. In principle, coupling efficiency can be improved to be close to 100% with accurate spatial control of the input beam. To evaluate coupling efficiency, the intra-cavity linear loss was adjusted while monitoring the reflected and intra-cavity powers with low incident pump power. The linear loss was adjusted via aperture loss through an intra-cavity iris 15 (see FIG. 1), which did not significantly disturb the cavity mode since the maximum introduced loss matched the output coupling value of only 10%. As the intra-cavity linear loss was increased, the reflected power passed through a minimum while the enhancement monotonically decreased. At the minimum point of reflected power, the total loss equals the impedance matching value and the enhancement experienced by the coupled light equals the inverse of the output coupling value. The reflected power at this value is the uncoupled amount since otherwise it would vanish. The coupling efficiency is therefore equal to one minus the ratio of the reflected power at this operating point to the incident pump power. We determine this coupling efficiency to be 55%.

Figure 13:
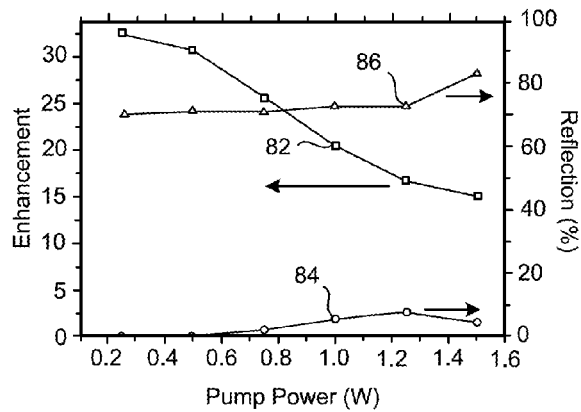
FIG. 13 plots enhancement, reflection, and conversion to super-fluorescence for unseeded C-OPCPA.

FIG. 13 shows—for the case where no signal/seed is present—the intra-cavity enhancement 82, the conversion to superfluorescence 84, and the percent reflected power 86. An enhancement of about 30 with a reflection of about 70% accounting for coupling efficiency was recorded, consistent with an intra-cavity linear loss of 2-3%. Therefore, as stated earlier, a nonlinear loss via conversion to signal and idler of 7-8% will give a total loss matching the input/output coupler 26 and allow impedance matching.

Figure 14:
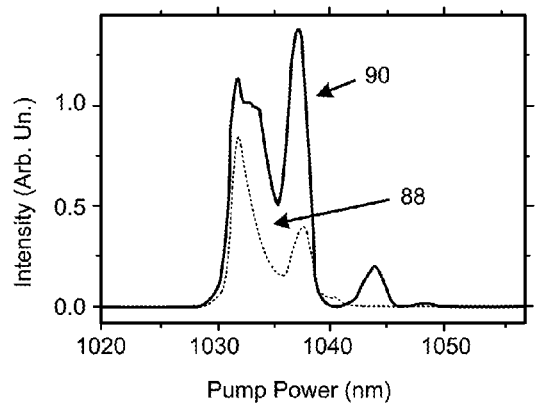
FIG. 14 plots the spectrum of intra-cavity pump for a seeded C-OPCPA and for unseeded C-OPCPA.

At the highest incident pump power of 1.3 W, the distortion of the intra-cavity power spectrum, as shown in FIG. 14 for seeded C-OPCPA 88 and unseeded C-OPCPA 90, is primarily due to conversion to superfluorescence but is also suggestive of slight self-phase modulation. Turning to seeded operation of the C-OPCPA apparatus, with only 1.3 W of incident pump power, 210 mW of the pump power was depleted into the signal, and we estimate 105 mW was depleted into the idler. The resulting signal spectrum 80 is shown in FIG. 12. In contrast, only 1.3 mW of amplified signal is observed in the single-pass configuration with this pump power (see FIG. 11), which is two orders of magnitude lower. Allowing for 55% coupling efficiency with an effective available pump power of only 650 mW, we were able to achieve nearly 45% pump depletion for a 78 MHz source. As discussed below, even though the intra-cavity conversion is much less than 45%, cavity enhancement with good average impedance matching enables the dramatic conversion efficiency improvement with respect to the coupled incident pump.

Figure 15:
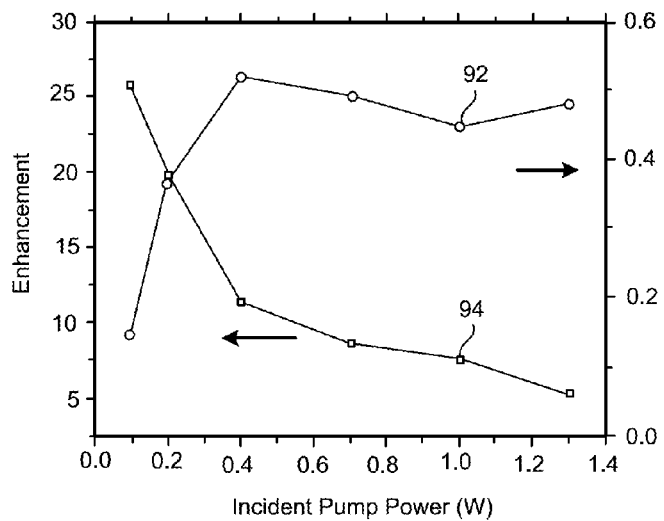
FIG. 15 plots the enhancement and total conversion for seeded C-OPCPA.

For quantitative evaluation of the C-OPCPA performance and the underlying impedance matching mechanism, the total conversion 92 to signal and idler and the enhancement 94 versus incident pump light power (including uncoupled light) were measured, as shown in FIG. 15. This figure reveals several features of the high-repetition-rate C-OPCPA. Firstly, this figure demonstrates the cavity's ability to passively maintain high conversion 92 in response to factors that reduce conversion. As the pump light power increases from zero, the net conversion efficiency quickly increases and saturates at about 50% for >0.4 W. Accordingly, the enhancement 94 is first high (about 26) and then quickly reduces to about 10 or less for >0.4 W.

The enhancement cavity 12 naturally employs increased enhancement to offset low incident power, thus maintaining intra-cavity peak intensity and conversion over a wide range of incident pump light powers. The passive self-adjustment results in the incident power threshold for amplification being about five times greater than that of the single-pass amplification. Secondly, this conversion curve 92 allows us to characterize the impedance matching operating point of the C-OPCPA system. Conversion of >50% is observed between 0.4 and 1 W of incident pump light power where the enhancement ranges from 11.4 to 7.4. The intra-cavity power spans 2.2 W to 4 W. The variation in enhancement across this range is low and close to 10, which is consistent with the impedance matching with a 10% input/output coupler 26.

According to the single-pass measurements with 4 W of pump power, the total conversion is about 8%. Thus, the nonlinear loss in the cavity at this power is also about 8%. Additionally, the linear loss is about 2%, allowing the total intra-cavity loss to match the impedance matching value of 10%. The maximum C-OPCPA conversion of 55%, however, is observed at 0.4 W of incident pump power. Accounting for coupling efficiency, the intra-cavity power at this operating point is 2.2 W, significantly lower than the value predicted in the single-pass case. The discrepancy possibly comes from the mode mismatch between a single-pass pump beam and the cavity mode. A slightly larger beam size at the PPLN for the single-pass case would shift the single-pass conversion curve to higher pump powers. Nevertheless, the trend observed in FIG. 15 and FIG. 11 is quantitatively consistent with the impedance matching analysis.

The advantage of using an enhancement cavity 12 stems from increased effective nonlinear drive by recycling the pump light power 37. The incident pump light power 18 required to achieve the desired intra-cavity pump light power is reduced by the impedance matching enhancement factor, which is 10 in this case. Thus, under impedance matching, the enhancement factor for the intra-cavity process significantly reduces the pump average power requirements. Additionally, only a fraction of the intra-cavity pump light power 37 is converted and is subsequently replaced by the next injected incident pump pulse 18. Thus a small fractional conversion of the intra-cavity pump light power 37 results in a large conversion of the incident pump light power 18. In the absence of linear losses for a 10% input/output coupler 26, as in this case, an intra-cavity pump light power level that allows a 10% single-pass total conversion yields 100% conversion of coupled pump light in the C-OPCPA case. With 3% linear loss, ideally 70% conversion is achievable (30% into linear losses). Here, 55% conversion was shown with only 400 mW of incident pump light power. Nonlinear and dispersive effects play a role in limiting conversion, as does temporally non-uniform impedance matching due to non-uniform pulse intensity profiles, but further improvements are expected as the cavity losses are reduced.

Additionally, as a first step in demonstration of bandwidth improvements of C-OPCPA as compared to single pass, we show efficient conversion in the presence of a wave-vector mismatch large enough to make single-pass conversion negligible. This is equivalent to extending the wavelength tunability well beyond the phase matching bandwidth. The experimental setup is similar to that of FIG. 1, except here the signal 16 is stretched more (by a factor of two); the average power of the signal 16 is more; and the pump power is different, as described below. The pump source 20 is a Yb fiber chirped-pulse amplifier system producing 500 fs pulses centered at 1034 nm with up to 4 W of average power. The seed/signal source 27 is an Er-doped fiber laser/amplifier centered at 1560 nm with 20 nm bandwidth. 2 mW of average power are used.

The signal 16 is stretched in 100 m of fiber, serving as the stretcher 28, to attain a 10 ps duration. Both laser sources have a 78-MHz repetition rate and are synchronized via electronic feedback. As before, the enhancement cavity 12 containing a 20 mm long PPLN, as the nonlinear medium 14, and a 10% input/output coupler 26 is locked to the pump source 20 via the Hänsch-Couillard locking scheme 30.

Figure 16:
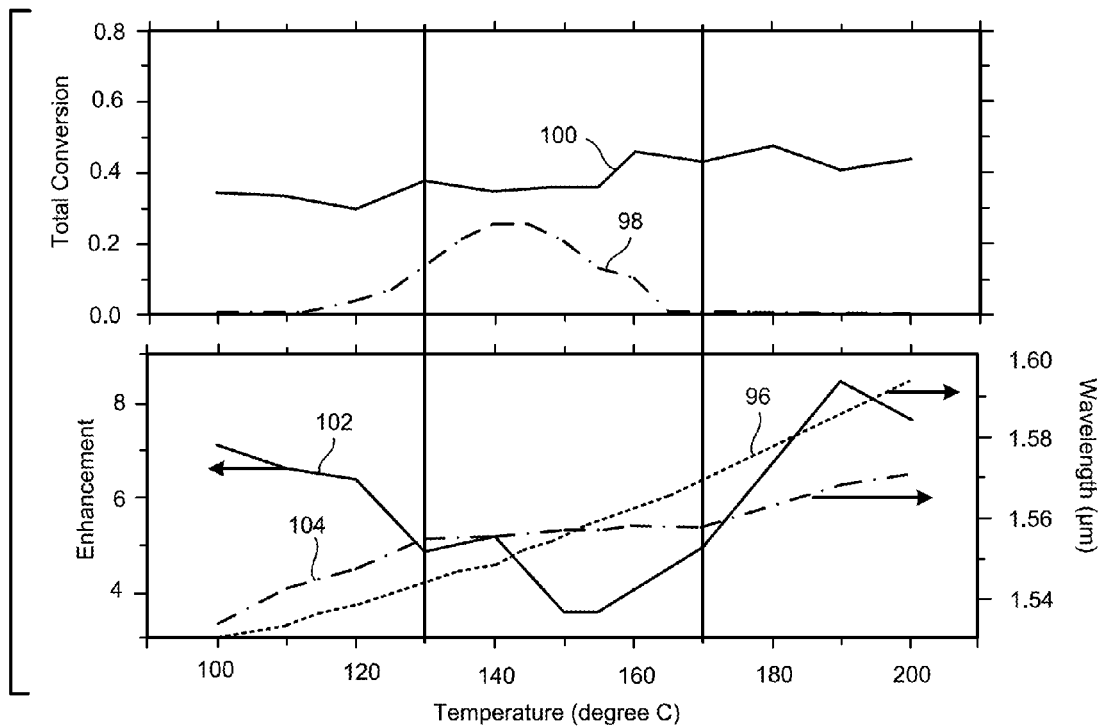
FIG. 16 plots the total conversion, enhancement, center wavelength and phase-matched wavelength as a function of the temperature of the periodically poled lithium niobate nonlinear medium.

FIG. 16 shows the bandwidth improvement as determined by observing continued high conversion into signal and idler while varying the phase matching by temperature tuning the periodically poled lithium niobate with the overlap between the pump and chirped seed fixed at their peaks. Curve 96 in FIG. 16 shows the actual phase-matched wavelength as the temperature is tuned while observing superfluorescence spectra. For C-OPCPA, 750 mW of coupled pump power was used. Since the phase matching bandwidth is intensity dependent, the single-pass pump intensity was chosen to be 4 W to match the intra-cavity power at the optimally phase-matched temperature for the C-OPCPA case, allowing a fair comparison. As the phase-matching wavelength is tuned, the efficiency of the single-pass conversion 98 drops off. The C-OPCPA conversion, in contrast is shown with curve 100. The phase-matching bandwidth in FWHM is observed to be 10 nm. In C-OPCPA, the cavity responds to the initially reduced conversion from wave-vector mismatch by increasing the enhancement 102 from 3 to 7, making available more intra-cavity pump power and maintaining the nonlinear process. The resulting effect is that the conversion 100 into signal and idler is maintained over the entire tuning range.

The central wavelength of the amplified signal is fixed in single pass, determined by the overlap of the gain window set pump and the highly chirped seed. However, in C-OPCPA as the temperature is tuned, more optimally phase matched signal wavelengths are brought under the gain window set by the pump pulse due to pump and signal walk off. Thus the central wavelength 104 of the amplified signal spectrum shifts. Across the range from 1543 nm (T=130° C.) to 1570 nm (T=170° C.) the central wavelength 104 of the amplified signal spectrum matches that of the seed, and we observe the cavity compensating wave-vector mismatch at the desired wavelength and maintaining uniform conversion 100 while the single-pass conversion 98 rolls off. At T=170° C., beyond the phase-matching bandwidth, the single pass has <1% conversion, while the C-OPCPA case has more than 40% conversion. Importantly, at T=200° C., the amplified signal spectrum has a central wavelength 104 at 1571 nm while the phase-matching wavelength 96 is at 1593 nm, beyond the phase-matching bandwidth by a factor of 2.2. Here, we have demonstrated the wide wavelength tenability of the C-OPCPA technique.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose.

Further, where parameters for various properties are specified herein for embodiments of the invention, those parameters can be adjusted up or down by $\frac{1}{100}^{th}$, $\frac{1}{50}^{th}$, $\frac{1}{20}^{th}$, $\frac{1}{10}^{th}$, $\frac{1}{5}^{th}$, $\frac{1}{3}^{rd}$, $\frac{1}{2}$, $\frac{3}{4}^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references optionally may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for cavity-enhanced optical parametric amplification, comprising:
   generating seed light pulses having a central seed wavelength, chirping the seed light pulses, and directing the chirped seed light pulses into an enhancement cavity at a full repetition rate, wherein the enhancement cavity defines a closed optical path and includes a nonlinear medium in the optical path;
   generating pump light pulses having a central pump wavelength, and directing the pump light pulses into the enhancement cavity at the full repetition rate, wherein the nonlinear medium provides phase matching at a wavelength different from the central seed wavelength and different from the central pump wavelength; and
   synchronizing the generation of the pump light pulses and seed light pulses to pass the chirped seed light pulses through the nonlinear medium simultaneously with the pump light pulses such that the chirped seed light pulses are parametrically amplified in the nonlinear medium to produce an amplified signal pulse and idler pulse.

2. The method of claim 1, wherein the central wavelength of the seed light pulses is about twice the central wavelength of the pump light pulses.

3. The method of claim 1, wherein the nonlinear medium provides phase matching at a wavelength at the central pump wavelength, resulting in bandwidth enhancement by at least a factor of 2.

4. The method of claim 1, wherein the nonlinear medium provides phase matching at a wavelength that differs from the central seed wavelength by at least 0.1 μm, resulting in octave spanning gain.

5. The method of claim 1, wherein the nonlinear medium biases a wave-vector mismatch versus wavelength such that the maximum deviation of the wave-vector mismatch from zero is maintained in a range from −0.01 and 0.01 mm$^{-1}$ over at least an octave of wavelengths for octave spanning gain.

6. The method of claim 1, wherein the amplified signal pulses have a wavelength spectrum extending over an octave.

7. The method of claim 6, wherein the amplified signal pulses have a wavelength spectrum extending from about 1.5 to about 3.5 μm.

8. The method of claim 1, wherein the amplified signal pulses and idler pulses have the same wavelength, and wherein the wavelength of the signal and idler pulses is twice the central wavelength of the pump light pulses.

9. The method of claim 1, wherein the nonlinear medium comprises periodically poled lithium niobate.

10. The method of claim 1, where the signal has sufficient chirp that each point in time can be treated as independent, allowing the pump signal interaction to be quasi-monochromatic and allowing optimal impedance matching and conversion for the interacting pulses in the cavity.

11. The method of claim 1, wherein only a portion of each pump light pulse is converted to amplify the seed pulse in the nonlinear medium, and a remaining portion of each pump light pulse is recirculated in the enhancement cavity and coherently added to each new incoming pump light pulse to form a recirculating intra-cavity pump light pulse.

12. The method of claim 11, wherein the phase matching is at a central signal wavelength, and wherein the recirculating intra-cavity pump light pulse has a conformal profile with a pair of intensity peaks that interact in the nonlinear medium with the outer bands of the intensity spectrum of the seed light pulse.

13. The method of claim 11, wherein the nonlinear medium provides phase matching at a wavelength different than a central signal wavelength, and wherein the recirculating intra-cavity pump light pulse has a conformal profile with two dips at times corresponding to phase-matched signal wavelengths.

14. The method of claim 11, wherein the cavity passively reshapes the intra-cavity pump light intensity, putting pump light intensity at temporal coordinates that have initially less conversion due to increased wave-vector mismatch or reduced pump/signal intensities, wherein the cavity passively reshapes the pump light profile to attain an optimal conforming shape defined by a given wavevector mismatch profile and intensity profiles.

15. The method of claim 11, wherein the method reaches a steady state where the pump light pulses entering the cavity have an intensity profile approximately equal to an intensity loss profile experienced by the recirculating pump pulse within each pass through the cavity.

16. The method of claim 11, wherein over 50% of each incident pump light pulse is converted to the amplified signal and idler pulses within each pass through the nonlinear medium in steady state.

17. The method of claim 11, wherein the recirculating pump pulse has an intensity at least 10 times greater than the intensity of each new pump light pulse directed into the enhancement cavity.

18. The method of claim 1, wherein the full repetition rate is at least 80 MHz.

19. The method of claim 1, wherein the pump light pulses are generated by an ytterbium-doped fiber laser.

20. The method of claim 19, further comprising locking the enhancement cavity to the ytterbium-doped fiber laser via a Hänsch-Couillaud scheme.

21. The method of claim 1, wherein the seed light pulses are generated by an erbium-doped fiber laser.

22. The method of claim 21, further comprising electronically locking the pump light pulse and seed light pulse repetition rates via feedback to a piezo-mounted cavity mirror in the erbium-doped fiber laser.

23. The method of claim 1, wherein the signal can be tuned across an octave, and wherein the cavity compensates for a wave-vector mismatch and provides uniform conversion into the signal as the wavelength is tuned, providing for wide wavelength tunability without adjusting the nonlinear medium.

24. A method for cavity-enhanced optical parametric amplification, comprising:
   generating seed light pulses having a central seed wavelength, chirping the seed light pulses, and directing the chirped seed light pulses into an enhancement cavity at a full repetition rate, wherein the enhancement cavity defines a closed optical path and includes a nonlinear medium in the optical path;
   generating chirped pump light pulses having a central pump wavelength, and directing the chirped pump light pulses into the enhancement cavity at the full repetition rate, wherein the nonlinear medium provides phase matching at a wavelength different from the central seed wavelength and different from the central pump wavelength; and
   synchronizing the generation of the pump light pulses and seed light pulses to pass the chirped seed light pulses through the nonlinear medium simultaneously with the pump light pulses such that the chirped seed light pulses are parametrically amplified in the nonlinear medium to produce an amplified signal pulse and idler pulse.

25. The method of claim 24, wherein the enhancement cavity includes an input/output coupler that has transmission characteristics that provide impedance matching over the full signal spectrum.

26. The method of claim 25, wherein the input/output coupler is a function of pump wavelength and is used with chirped pump light pulses of sufficient bandwidth and chirped seed wavelengths that correctly map an optimal output coupling value to each point in time to obtain a theoretically optimal impedance matched conversion over the broadest possible wavelength range.

27. A method for cavity-enhanced optical parametric amplification, comprising:
   generating seed light pulses having a central seed wavelength and directing the seed light pulses into an enhancement cavity at a full repetition rate, wherein the enhancement cavity defines a closed optical path and includes a nonlinear medium in the optical path;
   generating pump light pulses having a central pump wavelength, and directing the pump light pulses into the enhancement cavity at the full repetition rate, wherein the nonlinear medium provides phase matching at a wavelength different from the central seed wavelength and different from the central pump wavelength; and
   synchronizing the generation of the pump light pulses and seed light pulses to pass the seed light pulses through the nonlinear medium simultaneously with the pump light pulses such that the seed light pulses are parametrically amplified in the nonlinear medium to produce an amplified signal pulse and idler pulse.

* * * * *